(12) United States Patent
Lema et al.

(10) Patent No.: US 11,640,169 B2
(45) Date of Patent: *May 2, 2023

(54) SYSTEMS AND METHODS FOR DETERMINING PREFERENCES FOR CONTROL SETTINGS OF UNMANNED AERIAL VEHICLES

(71) Applicant: GoPro, Inc., San Mateo, CA (US)

(72) Inventors: Pablo Lema, Burlingame, CA (US); Shu Ching Ip, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 512 days.

This patent is subject to a terminal disclaimer.

(21) Appl. No.: 16/827,226

(22) Filed: Mar. 23, 2020

(65) Prior Publication Data
US 2020/0218264 A1 Jul. 9, 2020

Related U.S. Application Data

(63) Continuation of application No. 15/830,849, filed on Dec. 4, 2017, now Pat. No. 10,599,145, which is a (Continued)

(51) Int. Cl.
*H04N 21/25* (2011.01)
*G05D 1/00* (2006.01)
*B64C 39/02* (2023.01)

(52) U.S. Cl.
CPC ......... *G05D 1/0088* (2013.01); *B64C 39/024* (2013.01); *G05D 1/0011* (2013.01); (Continued)

(58) Field of Classification Search
CPC .. G05D 1/0088; G05D 1/0011; G05D 1/0094; G05D 1/0016; G05D 1/0038; (Continued)

(56) References Cited

U.S. PATENT DOCUMENTS 563,528 A 7/1896 Willson
5,432,871 A 7/1995 Novik
(Continued)

FOREIGN PATENT DOCUMENTS

EP 0605045 A1 7/1994
EP 0650299 A1 4/1995
EP 0661672 A1 7/1995

OTHER PUBLICATIONS

Benjamin Meyer et al, 'Real-time Free-Viewpoint Navigation from Compressed Multi-Video Recordings', Proc. 3D Data Processing, Visualization and Transmission (3DPVT), (May 31, 2010), pp. 1-6, URL: http://www.cg.cs.tu-bs.de/media/publications/meyer2010realtime.pdf, (Dec. 3, 2013), XP055091261.
(Continued)

*Primary Examiner* — Richard A Goldman
(74) *Attorney, Agent, or Firm* — Young Basile Hanlon & MacFarlane, P.C.

(57) ABSTRACT

Consumption information associated with a user consuming video segments may be obtained. The consumption information may define user engagement during a video segment and/or user response to the video segment. Sets of flight control settings associated with capture of the video segments may be obtained. The flight control settings may define aspects of a flight control subsystem for the unmanned aerial vehicle and/or a sensor control subsystem for the unmanned aerial vehicle. The preferences for the flight control settings of the unmanned aerial vehicle may be determined based upon the first set and the second set of flight control settings. Instructions may be transmitted to the unmanned aerial vehicle. The instructions may include the determined preferences for the flight control settings and being configured to cause the unmanned aerial vehicle to
(Continued)

adjust the flight control settings to the determined preferences.

20 Claims, 6 Drawing Sheets

Related U.S. Application Data continuation of application No. 15/600,158, filed on May 19, 2017, now Pat. No. 9,836,054, which is a continuation of application No. 15/045,171, filed on Feb. 16, 2016, now Pat. No. 9,665,098.

(52) U.S. Cl.
CPC .......... *G05D 1/0094* (2013.01); *H04N 21/251* (2013.01); *B64C 2201/027* (2013.01); *B64C 2201/108* (2013.01); *B64C 2201/127* (2013.01); *B64C 2201/141* (2013.01); *B64C 2201/146* (2013.01)

(58) Field of Classification Search
CPC ............ B64C 39/024; B64C 2201/027; B64C 2201/108; B64C 2201/127; B64C 2201/128; B64C 2201/14; B64C 2201/141; B64C 2201/145; B64C 2201/146; B64C 2201/156; B64C 2201/148; G06K 9/0063; G06K 9/00771; G06K 9/00785; G06K 9/3233; G06K 9/3241; G06K 9/6293; H04N 21/251
USPC ............ 701/1, 2, 25, 467; 382/103; 244/175
See application file for complete search history.

(56) References Cited

U.S. PATENT DOCUMENTS

| | | | |
|---|---|---|---|
| 6,384,862 B1 | 5/2002 | Brusewitz | |
| 6,434,265 B1 | 8/2002 | Xiong | |
| 6,486,908 B1 | 11/2002 | Chen | |
| 6,710,740 B2* | 3/2004 | Needham | H04N 1/32101 342/357.46 |
| 6,711,293 B1* | 3/2004 | Lowe | G06T 7/73 382/220 |
| 6,788,333 B1 | 9/2004 | Uyttendaele | |
| 6,798,897 B1 | 9/2004 | Rosenberg | |
| 7,092,012 B2 | 8/2006 | Nakamura | |
| 7,403,224 B2 | 7/2008 | Fuller | |
| 7,623,176 B2 | 11/2009 | Hoshino | |
| 7,983,502 B2 | 7/2011 | Cohen | |
| 8,044,992 B2 | 10/2011 | Kurebayashi | |
| 8,411,166 B2 | 4/2013 | Miyata | |
| 8,443,398 B2 | 5/2013 | Swenson | |
| 8,606,073 B2 | 12/2013 | Woodman | |
| 8,644,702 B1 | 2/2014 | Kalajan | |
| 8,670,030 B2 | 3/2014 | Tanaka | |
| 8,842,197 B2 | 9/2014 | Singh | |
| 8,890,954 B2 | 11/2014 | ODonnell | |
| 8,896,694 B2 | 11/2014 | O'Donnell | |
| 9,001,217 B2 | 4/2015 | Kinoshita | |
| 9,019,396 B2 | 4/2015 | Kiyoshige | |
| 9,056,676 B1* | 6/2015 | Wang | B64F 1/007 |
| 9,106,872 B2 | 8/2015 | Tsurumi | |
| 9,342,534 B2 | 5/2016 | Singh | |
| 9,412,278 B1* | 8/2016 | Gong | G06F 21/6227 |
| 9,473,758 B1 | 10/2016 | Long | |
| 9,602,795 B1 | 3/2017 | Matias | |
| 9,665,098 B1* | 5/2017 | Lema | G05D 1/0011 |
| 9,836,054 B1* | 12/2017 | Lema | H04N 21/251 |
| 10,599,145 B2* | 3/2020 | Lema | G05D 1/0094 |
| 10,877,477 B1* | 12/2020 | Fox | B64D 47/08 |
| 2002/0112005 A1 | 8/2002 | Namias | |
| 2002/0122113 A1 | 9/2002 | Foote | |
| 2002/0191087 A1 | 12/2002 | Hashimoto | |
| 2003/0085992 A1* | 5/2003 | Arpa | G06T 19/006 348/E7.086 |
| 2004/0021780 A1* | 2/2004 | Kogan | H04N 1/32128 348/231.3 |
| 2004/0047606 A1* | 3/2004 | Mikawa | H04N 5/772 386/E5.072 |
| 2004/0061667 A1 | 4/2004 | Sawano | |
| 2004/0075738 A1 | 4/2004 | Burke | |
| 2004/0135900 A1 | 7/2004 | Pyle | |
| 2004/0169724 A1 | 9/2004 | Ekpar | |
| 2004/0174434 A1 | 9/2004 | Walker | |
| 2004/0239763 A1 | 12/2004 | Notea | |
| 2005/0033760 A1 | 2/2005 | Fuller | |
| 2005/0062869 A1 | 3/2005 | Zimmermann | |
| 2005/0104976 A1 | 5/2005 | Currans | |
| 2005/0134707 A1 | 6/2005 | Perotti | |
| 2005/0289111 A1 | 12/2005 | Tribble | |
| 2006/0050997 A1 | 3/2006 | Imamura | |
| 2006/0195876 A1* | 8/2006 | Calisa | G08B 13/19682 348/E7.086 |
| 2007/0030358 A1 | 2/2007 | Aoyama | |
| 2007/0120986 A1 | 5/2007 | Nunomaki | |
| 2007/0140662 A1* | 6/2007 | Nunomaki | G11B 27/28 386/E5.072 |
| 2007/0279494 A1 | 12/2007 | Aman | |
| 2008/0094499 A1 | 4/2008 | Ueno | |
| 2008/0118100 A1 | 5/2008 | Hayashi | |
| 2009/0118896 A1* | 5/2009 | Gustafsson | G08G 5/0008 701/1 |
| 2009/0217343 A1 | 8/2009 | Bellwood | |
| 2009/0251558 A1 | 10/2009 | Park | |
| 2009/0262206 A1 | 10/2009 | Park | |
| 2010/0045773 A1 | 2/2010 | Ritchey | |
| 2010/0097443 A1 | 4/2010 | Lablans | |
| 2010/0228418 A1* | 9/2010 | Whitlow | H04N 7/188 701/25 |
| 2010/0238304 A1 | 9/2010 | Miyata | |
| 2010/0289924 A1 | 11/2010 | Koshikawa | |
| 2010/0299630 A1 | 11/2010 | McCutchen | |
| 2011/0115883 A1 | 5/2011 | Kellerman | |
| 2011/0141300 A1 | 6/2011 | Stec | |
| 2011/0261227 A1 | 10/2011 | Higaki | |
| 2012/0098981 A1* | 4/2012 | Ip | H04N 5/23219 348/E7.001 |
| 2012/0143482 A1* | 6/2012 | Goossen | G08G 5/0069 701/120 |
| 2012/0199689 A1 | 8/2012 | Burkland | |
| 2012/0199698 A1* | 8/2012 | Thomasson | B64C 39/024 244/175 |
| 2012/0242798 A1* | 9/2012 | McArdle | H04N 21/41407 348/46 |
| 2013/0058619 A1 | 3/2013 | Miyakawa | |
| 2013/0127903 A1 | 5/2013 | Paris | |
| 2013/0132462 A1 | 5/2013 | Moorer | |
| 2013/0176403 A1 | 7/2013 | Varga | |
| 2013/0182177 A1 | 7/2013 | Furlan | |
| 2013/0210563 A1 | 8/2013 | Hollinger | |
| 2013/0235226 A1 | 9/2013 | Karn | |
| 2013/0314442 A1* | 11/2013 | Langlotz | G06T 19/006 348/222.1 |
| 2014/0037268 A1 | 2/2014 | Shoji | |
| 2014/0049652 A1 | 2/2014 | Moon | |
| 2014/0067162 A1* | 3/2014 | Paulsen | G05D 1/0038 701/2 |
| 2014/0211987 A1* | 7/2014 | Fan | G06V 20/13 382/103 |
| 2014/0240122 A1 | 8/2014 | Roberts | |
| 2014/0267544 A1 | 9/2014 | Li | |
| 2014/0270480 A1 | 9/2014 | Boardman | |
| 2015/0055937 A1 | 2/2015 | Van Hoff | |
| 2015/0058102 A1 | 2/2015 | Christensen | |
| 2015/0134673 A1 | 5/2015 | Golan | |
| 2015/0186073 A1 | 7/2015 | Pacurariu | |
| 2015/0189221 A1* | 7/2015 | Nakase | G11B 31/006 386/225 |
| 2015/0287435 A1 | 10/2015 | Land | |

(56) References Cited

U.S. PATENT DOCUMENTS

| | | | |
|---|---|---|---|
| 2015/0296134 A1* | 10/2015 | Cudak | H04N 5/23206 348/207.1 |
| 2015/0341550 A1 | 11/2015 | Lay | |
| 2015/0346722 A1* | 12/2015 | Herz | G01S 19/13 701/2 |
| 2015/0362917 A1* | 12/2015 | Wang | G05D 1/0022 701/2 |
| 2016/0055883 A1* | 2/2016 | Soil | G06V 20/17 386/285 |
| 2016/0104284 A1* | 4/2016 | Maguire | G06T 7/80 348/187 |
| 2016/0112713 A1 | 4/2016 | Russell | |
| 2016/0117829 A1 | 4/2016 | Yoon | |
| 2016/0180197 A1* | 6/2016 | Kim | G01S 5/16 382/103 |
| 2016/0234438 A1 | 8/2016 | Satoh | |
| 2016/0239340 A1 | 8/2016 | Chauvet | |
| 2016/0269621 A1 | 9/2016 | Cho | |
| 2016/0274582 A1* | 9/2016 | Banda | B64C 39/024 |
| 2016/0308813 A1 | 10/2016 | Kalajan | |
| 2016/0313732 A1* | 10/2016 | Seydoux | G09G 5/12 |
| 2016/0313734 A1 | 10/2016 | Enke | |
| 2016/0366290 A1 | 12/2016 | Hoshino | |
| 2017/0015405 A1* | 1/2017 | Chau | G05D 1/0022 |
| 2017/0023939 A1* | 1/2017 | Krouse | G08G 5/0026 |
| 2018/0088579 A1 | 3/2018 | Lema | |
| 2018/0313658 A1* | 11/2018 | Matsui | B60R 1/00 |
| 2020/0238953 A1* | 7/2020 | Spasovski | G01C 21/3407 |
| 2021/0310826 A1* | 10/2021 | Peng | G08G 5/0013 |

OTHER PUBLICATIONS

Farin et al., "Shortest Circular Paths on Planar Graphs," In 27th Symposium on Information Theory in the Benelux 2006, 8 pgs.

Felix Klose et al, 'Stereoscopic 3D View Synthesis From Unsynchronized Multi-View Video', Proc. European Signal Processing Conference (EUSIPCO), Barcelona, Spain, (Sep. 2, 2011), pp. 1904-1909, URL: http://www.cg.cs.tu-bs.de/media/publications/eusipco2011_3d_synth.pdf, (Dec. 3, 2013), XP055091259.

Foote J et al, 'FlyCam: practical panoramic video and automatic camera control', Multimedia and Expo, 2000. ICME 2000. 2000 IEEE International Conference on New York, NY, USA Jul. 30-Aug. 2, 2000, Piscataway, NJ, USA,IEEE, US, (Jul. 30, 2000), vol. 3, doi:10.1109/ICME.2000.871033, ISBN 978-0-7803-6536-0, pp. 1419-1422, XP010512772.

Hossein Afshari et al: 'The PANOPTIC Camera: A Plenoptic Sensor with Real-Time Omnidirectional Capability', Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.

Lipski, C.: 'Virtual video camera', SIGGRAPH '09: Posters on, SIGGRAPH '09, vol. 0, Jan. 1, 2009 (Jan. 1, 2009), pp. 1-1, XP055091257, New York, New York, USA DOI: 10.1145/1599301.1599394.

Mai Zheng et al, Stitching Video from Webcams, Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, pp. 420-429, ISBN 978-3-540-89645-6, XP019112243.

PCT International Search Report for PCT/EP2014/057352 dated Jun. 27, 2014, 3 pages.

PCT International Search Report for PCT/EP2014/058008 dated May 26, 2014, 3 pages.

PCT International Search Report for PCT/EP2014/061897 dated Sep. 15, 2014, 3 pages.

Perazzi et al., "Panoramic Video from Unstructured Camera Arrays," Eurographics, vol. 34 (2015), No. 2, 12pgs.

Ryan Jackson: 'Shooting 360-degree video with four GoPro HD Hero cameras / Ryan Jackson Photography' Feb. 8, 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014] 37 pages.

U.S. Appl. No. 14/920,427, filed Oct. 22, 2015, entitled "Apparatus and Methods for Embedding Metadata Into Video Stream" 62 pages.

U.S. Appl. No. 14/927,343, filed Oct. 29, 2015, entitled "Apparatus and Methods for Rolling Shutter Compensation for Multi-Camera Systems" 45 pages.

U.S. Appl. No. 14/949,786, filed Nov. 23, 2015, entitled "Apparatus and Methods for Image Alignment" 67 pages.

U.S. Appl. No. 15/001,038, filed Jan. 19, 2016, entitled "Metadata Capture Apparatus and Methods" 54 pages.

Zhi et al., "Toward Dynamic Image Mosaic Generation With Robustness to Parallax," IEEE Transactions on Image Processing, vol. 21, No. 1, Jan. 2012, pp. 366-378.

* cited by examiner

SYSTEMS AND METHODS FOR DETERMINING PREFERENCES FOR CONTROL SETTINGS OF UNMANNED AERIAL VEHICLES

CROSS-REFERENCE TO RELATED APPLICATION(S)

This application is a continuation of U.S. patent application Ser. No. 15/830,849, filed Dec. 4, 2017, which is a continuation of U.S. patent application Ser. No. 15/600,158, filed on May 19, 2017, now U.S. Pat. No. 9,836,054, which is a continuation of U.S. patent application Ser. No. 15/045,171, filed on Feb. 16, 2016, now U.S. Pat. No. 9,665,098, the entire disclosures of which are hereby incorporated by reference.

TECHNICAL FIELD

The disclosure relates to systems and methods for determining preferences for flight control settings of an unmanned aerial vehicle based upon content consumed by a user.

BACKGROUND

Unmanned aerial vehicles, or UAVs, may be equipped with automated flight control, remote flight control, programmable flight control, other types of flight control, and/or combinations thereof. Some UAVs may include sensors, including but not limited to, image sensors configured to capture image information. UAVs may be used to capture special moments, sporting events, concerts, etc. UAVs may be preconfigured with particular flight control settings. The preconfigured flight control settings may not be individualized for each user of the UAV. Configuration may take place through manual manipulation by the user. Adjustment of flight control settings may impact various aspects of images and/or videos captured by the image sensors of the UAV.

SUMMARY

The disclosure relates to determining preferences for flight control settings of an unmanned aerial vehicle based upon user consumption of previously captured content, in accordance with one or more implementations. Consumption information associated with a user consuming a first video segment and a second video segment may be obtained. The consumption information may define user engagement during a video segment and/or user response to the video segment. A first set of flight control settings associated with capture of the first video segment and a second set of flight control settings associated with capture of the second video segment may be obtained. Based upon a determination relative to user interest of the first video segment and the second video segment (e.g., the user may view the first video segment more frequently than the second video segment, the user may share portions of the first video segment more than portions of the second video segment, etc.), preferences for the flight control settings of the unmanned aerial vehicle may be determined based upon the first set of flight control settings and/or the second set of flight control settings. Instructions may be transmitted to the unmanned aerial vehicle including the determined preferences for the flight control settings. The instructions may be configured to cause the unmanned aerial vehicle to adjust the flight control settings to the determined preferences.

In some implementations, a system configured to determine preferences for flight control settings of an unmanned aerial vehicle based upon user consumption of previously captured content may include one or more servers. The server(s) may be configured to communicate with one or more client computing platforms according to a client/server architecture. The users of the system may access the system via client computing platform(s). The server(s) may be configured to execute one or more computer program components. The computer program components may include one or more of an authentication component, a consumption component, a flight control settings component, a preferences component, a transmission component, and/or other components.

The authentication component may be configured to authenticate a user associated with one or more client computing platforms accessing one or more images and/or video segments via the system. The authentication component may manage accounts associated with users and/or consumers of the system. The user accounts may include user information associated with users and/or consumers of the user accounts. User information may include information stored by the server(s), one or more client computing platforms, and/or other storage locations.

The consumption component may be configured to obtain consumption information associated with a user consuming a first video segment and a second video segment. The first video segment and the second video segment may be available for consumption within the repository of video segments available via the system and/or available on a third party platform, which may be accessible and/or available via the system. The consumption information may define user engagement during a video segment and/or user response to the video segment. User engagement during the video segment may include at least one of an amount of time the user consumed the video segment and a number of times the user consumes at least one portion of the video segment. The consumption component may track user engagement and/or viewing habits during the video segment and/or during at least one portion of the video segment. User response to the video segment may include one or more of commenting on the video segment, rating the video segment, up-voting (e.g., "liking") the video segment, and/or sharing the video segment. Consumption information may be stored by the server(s), the client computing platforms, and/or other storage locations. The consumption component may be configured to determine a consumption score associated with the consumption information associated with the user consuming the video segment. The consumption score may quantify a degree of interest of the user consuming the video segment and/or the at least one portion of the video segment.

The flight control settings component may be configured to obtain a first set of flight control settings associated with capture of the first video segment consumed by the user and a second set of flight control settings associated with capture of the second video segment consumed by the user. Flight control settings of the unmanned aerial vehicle may define aspects of a flight control subsystem and/or a sensor control subsystem for the unmanned aerial vehicle. Flight control settings may include one or more of an altitude, a longitude, a latitude, a geographical location, a heading, a speed, and/or other flight control settings of the unmanned aerial vehicle. Flight control settings of the unmanned aerial vehicle may be based upon a position of the unmanned aerial vehicle. The position of the unmanned aerial vehicle may impact capture of an image and/or video segment. For example, an altitude in which the unmanned aerial vehicle is flying and/or hovering may impact the visual information captured by an image sensor (e.g., the visual information may be captured at different angles based upon the altitude of the unmanned aerial vehicle). A speed and/or direction in which the unmanned aerial vehicle is traveling may capture different visual information.

The sensor control subsystem may be configured to control one or more sensors through adjustments of an aperture timing, an exposure, a focal length, an angle of view, a depth of field, a focus, a light metering, a white balance, a resolution, a frame rate, an object of focus, a capture angle, a zoom parameter, a video format, a sound parameter, a compression parameter, and/or other sensor controls. The one or more sensors may include an image sensor and may be configured to generate an output signal conveying visual information (e.g., an image and/or video segment) within a field of view. The visual information may include video information, audio information, geolocation information, orientation and/or motion information, depth information, and/or other information.

The preferences component may be configured to determine the preferences for the flight control settings of the unmanned aerial vehicle based upon the first set of flight control settings and the second set of flight control settings. The preferences for the flight control settings may be associated with the user who consumed the first video segment and the second video segment. The preferences for the flight control settings may be determined based upon the consumption score associated with the first video segment and/or the consumption score associated with the second video segment. For example, the preferences for the flight control settings for the unmanned aerial vehicle may be determined based upon the obtained first set of flight control settings associated with the first video segment, such that the preferences for the flight control settings may be determined to be the same as the first set of flight control settings. The preferences for the flight control settings for the unmanned aerial vehicle may be determined based upon the obtained second set of flight control settings associated with the second video segment, such that the preferences for the flight control settings may be determined to be the same as the second set of flight control settings. The preferences for the flight control settings for the unmanned aerial vehicle may be a combination of the first set of flight control settings and the second set of flight control settings. The combination may be based upon commonalities between the first set of flight control settings and the second set of flight control settings, such that the preferences for the flight control settings for the unmanned aerial vehicle may be determined to be the common flight control settings between the first set of flight control settings and the second set of flight control settings.

The transmission component may be configured to effectuate transmission of instructions to the unmanned aerial vehicle. The instructions may include the determined preferences for the flight control settings. The instructions may be configured to cause the unmanned aerial vehicle to adjust the flight control settings of the unmanned aerial vehicle to the determined preferences. The instructions may be configured to cause the unmanned aerial vehicle to automatically adjust the flight control settings of the unmanned aerial vehicle to the determined preferences the next time the unmanned aerial vehicle is activated (e.g., turned on, in use, and/or capturing an image and/or video segment) or each time the unmanned aerial vehicle is activated. The unmanned aerial vehicle may adjust the flight control settings prior to and/or while capturing an image and/or video segment. The instructions may be configured to cause the unmanned aerial vehicle to automatically adjust the flight control settings of the unmanned aerial vehicle to the determined preferences based upon current contextual information associated with the unmanned aerial vehicle and current flight control settings of the unmanned aerial vehicle. Contextual information associated with capture of video segments may define one or more temporal attributes and/or spatial attributes associated with capture the video segments. Contextual information may include any information pertaining to an environment in which the video segment was captured. Contextual information may include visual and/or audio information based upon the environment in which the video segment was captured. Temporal attributes may define a time in which the video segment was captured (e.g., date, time, time of year, season, etc.). Spatial attributes may define the environment in which the video segment was captured (e.g., location, landscape, weather, surrounding activities, etc.). The one or more temporal attributes and/or spatial attributes may include one or more of a geolocation attribute, a time attribute, a date attribute, and/or a content attribute.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
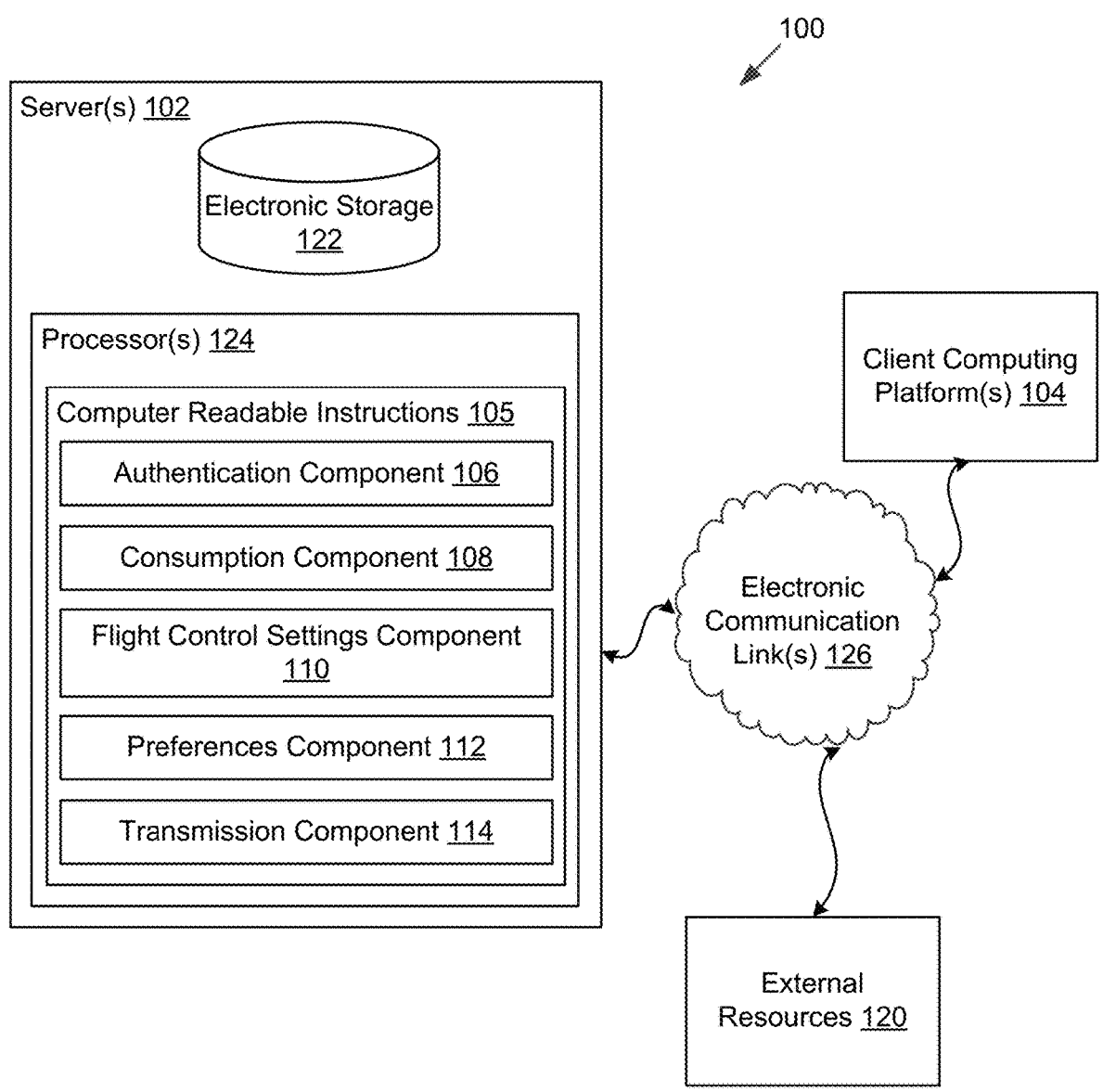
FIG. 1 illustrates a system for determining preferences for flight control settings of an unmanned aerial vehicle, in accordance with one or more implementations.

FIG. 1 illustrates a system 100 for determining preferences for flight control settings of an unmanned aerial vehicle based upon user consumption of previously captured content, in accordance with one or more implementations. As is illustrated in FIG. 1, system 100 may include one or more servers 102. Server(s) 102 may be configured to communicate with one or more client computing platforms 104 according to a client/server architecture. The users of system 100 may access system 100 via client computing platform(s) 104. Server(s) 102 may be configured to execute one or more computer program components. The computer program components may include one or more of authentication component 106, consumption component 108, flight control settings component 110, preferences component 112, transmission component 114, and/or other components.

A repository of images and/or video segments may be available via system 100. The repository of images and/or video segments may be associated with different users. The video segments may include a compilation of videos, video segments, video clips, and/or still images. While the present disclosure may be directed to video and/or video segments captured by image sensors and/or image capturing devices associated with unmanned aerial vehicles (UAVs), one or more other implementations of system 100 and/or server(s) 102 may be configured for other types of media items. Other types of media items may include one or more of audio files (e.g., music, podcasts, audio books, and/or other audio files), multimedia presentations, photos, slideshows, and/or other media files. The video segments may be received from one or more storage locations associated with client computing platform(s) 104, server(s) 102, and/or other storage locations where video segments may be stored. Client computing platform(s) 104 may include one or more of a cellular telephone, a smartphone, a digital camera, a laptop, a tablet computer, a desktop computer, a television set-top box, a smart TV, a gaming console, and/or other client computing platforms.

Authentication component 106 may be configured to authenticate a user associated with client computing platform 104 accessing the repository of images and/or video segments via system 100. Authentication component 106 may manage accounts associated with users and/or consumers of system 100. The user accounts may include user information associated with users and/or consumers of the user accounts. User information may include information stored by server(s) 102, one or more client computing platform(s) 104, and/or other storage locations.

User information may include one or more of information identifying users and/or consumers (e.g., a username or handle, a number, an identifier, and/or other identifying information), security login information (e.g., a login code or password, a user ID, and/or other information necessary for the user to access server(s) 102), system usage information, external usage information (e.g., usage of one or more applications external to system 100 including one or more of online activities such as in social networks and/or other external applications), subscription information, a computing platform identification associated with the user and/or consumer, a phone number associated with the user and/or consumer, privacy settings information, and/or other information related to users and/or consumers.

Authentication component 106 may be configured to obtain user information via one or more client computing platform(s) 104 (e.g., user input via a user interface, etc.). If a user and/or consumer does not have a preexisting user account associated with system 100, a user and/or consumer may register to receive services provided by server 102 via a website, web-based application, mobile application, and/or user application. Authentication component 106 may be configured to create a user ID and/or other identifying information for a user and/or consumer when the user and/or consumer registers. The user ID and/or other identifying information may be associated with one or more client computing platforms 104 used by the user and/or consumer. Authentication component 106 may be configured to store such association with the user account of the user and/or consumer. A user and/or consumer may associate one or more accounts associated with social network services, messaging services, and the like with an account provided by system 100.

Consumption component 108 may be configured to obtain consumption information associated with a user consuming video segments. The consumption information for a given video segment may define user engagement during the given video segment and/or user response to the given video segment. The consumption information may include consumption information for a first video segment and consumption information for a second video segment. Consumption component 108 may be configured to obtain consumption information associated with the user consuming the first video segment and the second video segment. The first video segment and/or the second video segment may be available for consumption within the repository of video segments available via system 100. The first video segment and/or the second video segment may be available on a third party platform, which may be accessible and/or available via system 100. While two video segments have been described herein, this is not meant to be a limitation of the disclosure, as consumption component 108 may be configured to obtain consumption information with any number of video segments.

The consumption information may define user engagement during the given video segment and/or user response to the given video segment. User engagement during the given video segment may include at least one of an amount of time the user consumes the given video segment and a number of times the user consumes at least one portion of the given video segment. Consumption component 108 may track user engagement and/or viewing habits during the given video segment and/or during at least one portion of the given video segment. Viewing habits during consumption of the given video segment may include an amount of time the user views the given video segment and/or at least one portion of the given video segment, a number of times the user views the given video segment and/or the at least one portion of the given video segment, a number of times the user views other video segments related to the given video segment and/or video segments related to the at least one portion of the given video segment, and/or other user viewing habits. User response to the given video segment may include one or more of commenting on the given video segment, rating the given video segment, up-voting (e.g., "liking") the given video segment, and/or sharing the given video segment. Consumption information may be stored by server(s) 102, client computing platforms 104, and/or other storage locations.

Consumption component 108 may be configured to determine a consumption score associated with the consumption information associated with the user consuming the given video segment. The consumption score may quantify a degree of interest of the user consuming the given video segment and/or the at least one portion of the given video segment. Consumption component 108 may determine the consumption score based upon the user engagement during the given video segment, the user response to the given video segment, and/or other factors. Consumption scores may be a sliding scale of numerical values (e.g., 1, 2, . . . n, where a number may be assigned as low and/or high), verbal levels (e.g., very low, low, medium, high, very high, and/or other verbal levels), and/or any other scheme to represent a consumption score. Individual video segments may have one or more consumption scores associated with it. For example, different portions of the individual video segments may be associated with individual consumption scores. An aggregate consumption score for a given video segment may represent a degree of interest of the user consuming the given video segment based upon an aggregate of consumption scores associated with the individual portions of the given video segment. Consumption scores may be stored by server(s) 102, client computing platforms 104, and/or other storage locations.

Figure 2:
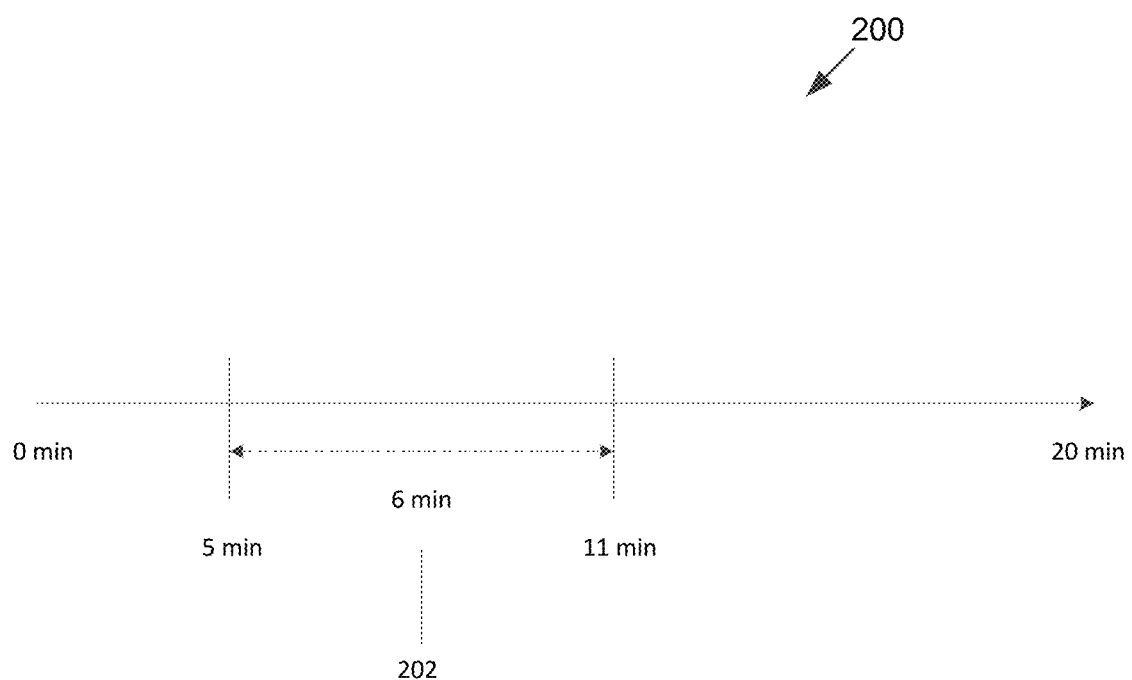
FIG. 2 illustrates an exemplary timeline of a video segment, in accordance with one or more implementations.

For example and referring to FIG. 2, first video segment 200 including at least one portion 202 may be included within the repository of video segments available via system 100. While first video segment 200 is shown to be over 20 minutes long, this is for exemplary purposes only and is not meant to be a limitation of this disclosure, as video segments may be any length of time. If the user frequently consumes and/or views first video segment 200 and/or at least one portion 202 of first video segment 200, consumption component 108 from FIG. 1 may associate first video segment 200 and/or at least one portion 202 of first video segment 200 with a consumption score representing a higher degree of interest of the user than other video segments that the user did not consume as frequently as first video segment 200. If the user consumes the 6 minutes of at least one portion 202 of first video segment 200 more often than other portions of first video segment 200, consumption component 108 from FIG. 1 may associate at least one portion 202 of first video segment 200 with a consumption score representing a higher degree of interest of the user than other portions of first video segment 200 that the user did not consume as frequently as at least one portion 202. In another example, if the user comments on the second video segment (not shown), rates the second video segment, shares the second video segment and/or at least one portion of the second video segment, and/or endorses the second video segment in other ways, consumption component 108 may associate the second video segment and/or the at least one portion of the second video segment with a consumption score representing a higher degree of interest of the user than other video segments that the user did not comment on, rate, share, up-vote, and/or endorse in other ways.

Figure 3:
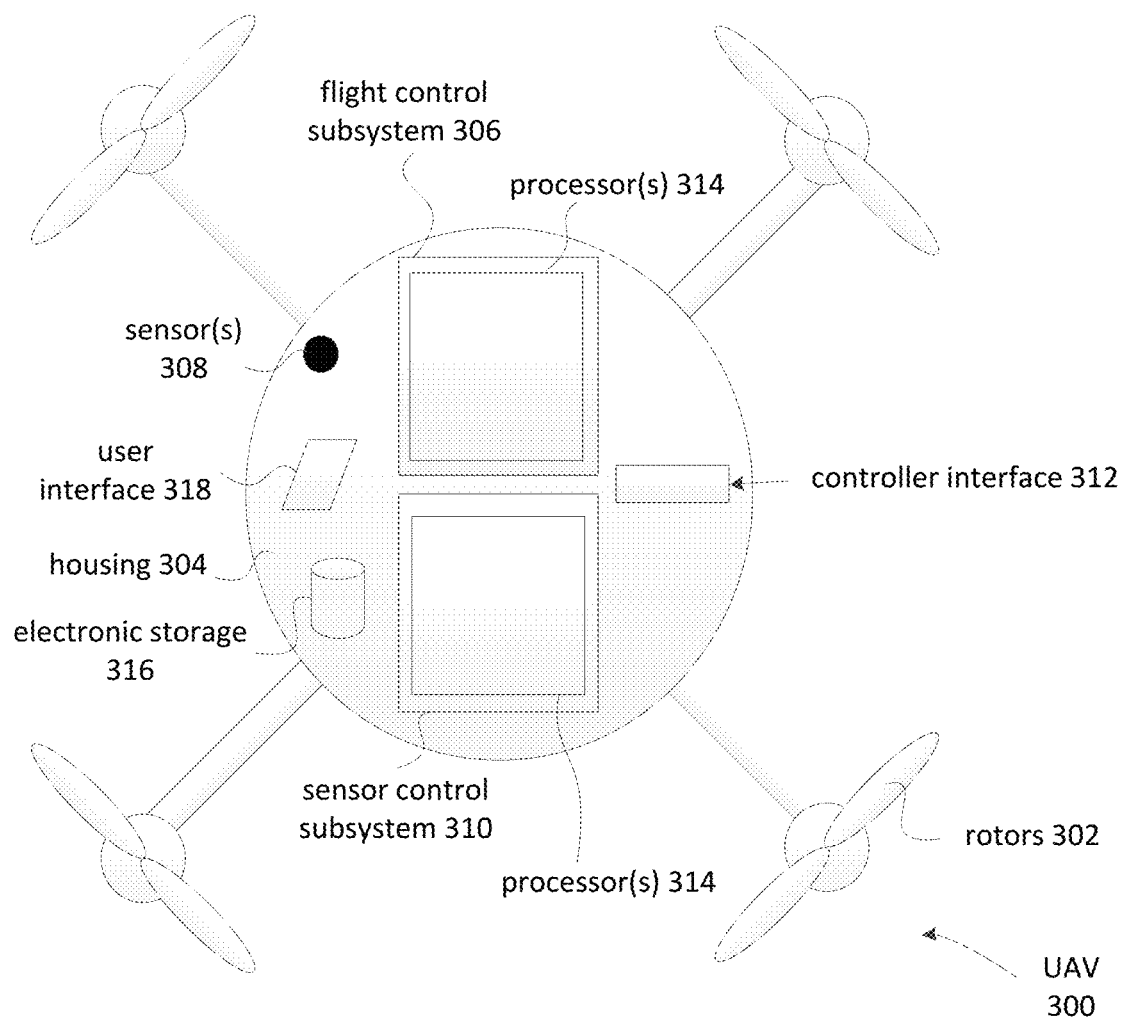
FIG. 3 illustrates an unmanned aerial vehicle in accordance with one or more implementations.

Video segments may be captured by one or more sensors associated with an unmanned aerial vehicle. The one or more sensors may include one or more image sensors and may be configured to generate an output signal conveying visual information within a field of view of the one or more sensors. Referring to FIG. 3, unmanned aerial vehicle 300 (also referred to herein as UAV 300) is illustrated. While UAV 300 is shown as a quadcopter, this is for exemplary purposes only and is not meant to be a limitation of this disclosure. As illustrated in FIG. 3, UAV 300 may include four rotors 302. The number of rotors of UAV 300 is not meant to be limiting in anyway, as UAV 300 may include any number of rotors. UAV 300 may include one or more of housing 304, flight control subsystem 306, one or more sensors 308, sensor control subsystem 310, controller interface 312, one or more physical processors 314, electronic storage 316, user interface 318, and/or other components. In some implementations, a remote controller (not shown) may be available as a beacon to guide and/or control UAV 300.

Housing 304 may be configured to support, hold, and/or carry UAV 300 and/or components thereof.

Flight control subsystem 306 may be configured to provide flight control for UAV 300. Flight control subsystem 306 may include one or more physical processors 314 and/or other components. Operation of flight control subsystem 306 may be based on flight control settings and/or flight control information. Flight control information may be based on information and/or parameters determined and/or obtained to control UAV 300. In some implementations, providing flight control settings may include functions including, but not limited to, flying UAV 300 in a stable manner, tracking people or objects, avoiding collisions, and/or other functions useful for autonomously flying unmanned aerial vehicle 300. In some implementations, flight control information may be transmitted by a remote controller. In some implementations, flight control information and/or flight control settings may be received by controller interface 312.

Sensor control subsystem 310 may include one or more physical processors 314 and/or other components. While single sensor 308 is depicted in FIG. 3, this is not meant to be limiting in any way. UAV 300 may include any number of sensors 308. Sensor 308 may include an image sensor and may be configured to generate an output signal conveying visual information (e.g., an image and/or video segment) within a field of view. The visual information may include video information, audio information, geolocation information, orientation and/or motion information, depth information, and/or other information. The visual information may be marked, timestamped, annotated, and/or otherwise processed such that information captured by sensor(s) 308 may be synchronized, aligned, annotated, and/or otherwise associated therewith. Sensor control subsystem 310 may be configured to control one or more sensors 308 through adjustments of an aperture timing, an exposure, a focal length, an angle of view, a depth of field, a focus, a light metering, a white balance, a resolution, a frame rate, an object of focus, a capture angle, a zoom parameter, a video format, a sound parameter, a compression parameter, and/or other sensor controls.

(01) User interface 318 of UAV 300 may be configured to provide an interface between UAV 300 and a user (e.g. a remote user using a graphical user interface) through which the user may provide information to and receive information from UAV 300. This enables data, results, and/or instructions and any other communicable items to be communicated between the user and UAV 300, such as flight control settings and/or image sensor controls. Examples of interface devices suitable for inclusion in user interface 318 may include a keypad, buttons, switches, a keyboard, knobs, levers, a display screen, a touch screen, speakers, a microphone, an indicator light, an audible alarm, and a printer. Information may be provided to a user by user interface 318 in the form of auditory signals, visual signals, tactile signals, and/or other sensory signals.

It is to be understood that other communication techniques, either hard-wired or wireless, may be contemplated herein as user interface 318. For example, in one embodiment, user interface 318 may be integrated with a removable storage interface provided by electronic storage 316. In this example, information is loaded into UAV 300 from removable storage (e.g., a smart card, a flash drive, a removable disk, etc.) that enables the user(s) to customize UAV 300. Other exemplary input devices and techniques adapted for use with UAV 300 as user interface 318 may include, but are not limited to, an RS-232 port, RF link, an IR link, modem (telephone, cable, Ethernet, internet or other). In short, any technique for communicating information with UAV 300 may be contemplated as user interface 318.

Flight control settings of UAV 300 may define aspects of flight control subsystem 306 for UAV 300 and/or sensor control subsystem 310 for UAV 300. Flight control settings may include one or more of an altitude, a longitude, a latitude, a geographical location, a heading, a speed, and/or other flight control settings of UAV 300. Flight control settings of UAV 300 may be based upon a position of UAV 300 (including a position of a first unmanned aerial vehicle within a group of unmanned aerial vehicles with respect to positions of the other unmanned aerial vehicles within the group of unmanned aerial vehicles). A position of UAV 300 may impact capture of an image and/or video segment. For example, an altitude in which UAV 300 is flying and/or hovering may impact the visual information captured by sensor(s) 308 (e.g., the visual information may be captured at different angles based upon the altitude of UAV 300). A speed and/or direction in which UAV 300 is flying may capture different visual information.

Flight control settings may be determined based upon flight control information (e.g., an altitude at which UAV 300 is flying, a speed at which UAV 300 is traveling, etc.), output from one or more sensors 308 that captured the visual information, predetermined flight control settings of UAV 300 that captured the visual information, flight control settings preconfigured by a user prior to, during, and/or after capture, and/or other techniques. Flight control settings may be stored and associated with captured visual information (e.g., images and/or video segments) as metadata and/or tags.

Referring back to FIG. 1, flight control settings component 110 may be configured to obtain sets of flight control settings associated with capture of the video segments. The sets of flight control settings may include a first set of flight control settings associated with capture of the first video segment and a second set of flight control settings associated with capture of the second video segment. Flight control settings component 110 may be configured to obtain the first set of flight control settings associated with capture of the first video segment and to obtain the second set of flight control settings associated with capture of the second video segment consumed by the user.

Flight control settings component 110 may determine flight control settings of the unmanned aerial vehicle that captured the individual video segments directly from the video segment, via metadata associated with the given video segment and/or portions of the given video segment, and/or via tags associated with the given video segment and/or portions of the given video segment. At the time when the given video segment was captured and/or stored, flight control settings of the unmanned aerial vehicle capturing the given video segment may have been recorded and/or stored in memory and associated with the given video segment and/or portions of the given video segment. Flight control settings may vary throughout a given video segment, as different portions of the given video segment at different points in time of the given video segment may be associated with different flight control settings of the unmanned aerial vehicle (e.g., the unmanned aerial vehicle may be in different positions at different points in time of the given video segment). Flight control settings component 110 may determine the first set of flight control settings associated with capture of the first video segment directly from the first video segment. Flight control settings component 110 may obtain the first set of flight control settings associated with capture of the first video segment via metadata and/or tags associated with the first video segment and/or portions of the first video segment. Flight control settings component 110 may determine the second set of flight control settings associated with capture of the second video segment directly from the second video segment. Flight control settings component 110 may obtain the second set of flight control settings associated with capture of the second video segment via metadata and/or tags associated with the second video segment and/or portions of the second video segment.

Preferences component 112 may be configured to determine the preferences for the flight control settings of the unmanned aerial vehicle based upon the first set of flight control settings and the second set of flight control settings. The preferences for the flight control settings may be associated with the user who consumed the first video segment and the second video segment. The preferences for the flight control settings may be determined based upon the consumption score associated with the first video segment and/or the consumption score associated with the second video segment. For example, the preferences for the flight control settings for the unmanned aerial vehicle may be determined based upon the obtained first set of flight control settings associated with the first video segment, such that the preferences for the flight control settings may be determined to be the same as the first set of flight control settings. The preferences for the flight control settings for the unmanned aerial vehicle may be determined based upon the obtained second set of flight control settings associated with the second video segment, such that the preferences for the flight control settings may be determined to be the same as the second set of flight control settings. The preferences for the flight control settings for the unmanned aerial vehicle may be a combination of the first set of flight control settings and the second set of flight control settings. The combination may be based upon commonalities between the first set of flight control settings and the second set of flight control settings, such that the preferences for the flight control settings for the unmanned aerial vehicle may be determined to be the common flight control settings between the first set of flight control settings and the second set of flight control settings.

The preferences for the flight control settings may be based upon individual video segments and/or portions of video segments that may be associated with consumption scores representing a higher degree of interest of the user than other video segments and/or portions of video segments. Preferences component 112 may determine commonalities between individual video segments and/or portions of video segments with consumption scores representing a higher degree of interest of the user (e.g., the first video segment and the second video segment). Commonalities between the video segments and/or portions of video segments with consumption scores representing a higher degree of interest of the user may include common flight control settings between the video segments and/or portions of video segments with consumption scores representing a higher degree of interest of the user. For example, if the first video segment and the second video segment are associated with consumption scores representing a higher degree of interest of the user, preferences component 112 may determine common flight control settings between the first video segment (e.g., the first set of flight control settings) and the second video segment (e.g., the second set of flight control settings) and/or portions of the first video segment and portions of the second video segment. Preferences component 112 may determine the preferences for the flight control settings for the unmanned aerial vehicle to be the common flight control settings between the first set of flight control settings and the second set of flight control settings.

Commonalities between the video segments and/or portions of video segments with consumption scores representing a higher degree of interest of the user may include common contextual information associated with capture of the video segments and/or portions of video segments with consumption scores representing a higher degree of interest of the user. Contextual information associated with capture of the video segments and/or portions of video segments may define one or more temporal attributes and/or spatial attributes associated with capture of the video segments and/or portions of video segments. Contextual information may include any information pertaining to an environment in which the video segment was captured. Contextual information may include visual and/or audio information based upon the environment in which the video segment was captured. Temporal attributes may define a time in which the video segment was captured (e.g., date, time, time of year, season, etc.). Spatial attributes may define the environment in which the video segment was captured (e.g., location, landscape, weather, surrounding activities, etc.). The one or more temporal attributes and/or spatial attributes may include one or more of a geolocation attribute, a time attribute, a date attribute, and/or a content attribute. System 100 may obtain contextual information associated with capture of the video segments directly from the video segments, via metadata associated with the video segments and/or portions of the video segments, and/or tags associated with the video segments and/or portions of the video segments. For example, different portions of the video segments may include different tags and/or may be associated with different metadata including contextual information and/or flight control setting information.

A geolocation attribute may include a physical location of where the video segment was captured. The geolocation attribute may correspond to one or more of a compass heading, one or more physical locations of where the video segment was captured, a pressure at the one or more physical locations, a depth at the one or more physical locations, a temperature at the one or more physical locations, and/or other information. Examples of the geolocation attribute may include the name of a country, region, city, a zip code, a longitude and/or latitude, and/or other information relating to a physical location where the video segment and/or portion of the video segment was captured.

A time attribute may correspond to a one or more timestamps associated with when the video segment was captured. Examples of the time attribute may include a time local to the physical location (which may be based upon the geolocation attribute) of when the video segment was captured, the time zone associated with the physical location, and/or other information relating to a time when the video segment and/or portion of the video segment was captured.

A date attribute may correspond to a one or more of a date associated with when the video segment was captured, seasonal information associated with when the video segment was captured, and/or a time of year associated with when the video segment was captured.

A content attribute may correspond to one or more of an action depicted within the video segment, one or more objects depicted within the video segment, and/or a landscape depicted within the video segment. For example, the content attribute may include a particular action (e.g., running), object (e.g., a building), and/or landscape (e.g., beach) portrayed and/or depicted in the video segment. One or more of an action depicted within the video segment may include one or more of sport related actions, inactions, motions of an object, and/or other actions. One or more of an object depicted within the video segment may include one or more of a static object (e.g., a building), a moving object (e.g., a moving train), a particular actor (e.g., a body), a particular face, and/or other objects. A landscape depicted within the video segment may include scenery such as a desert, a beach, a concert venue, a sports arena, etc. Content of the video segment may be determined based upon object detection of content included within the video segment.

Preferences component 112 may determine and/or obtain contextual information associated with capture of the first video segment and/or the second video segment. Based upon commonalities between the contextual information associated with capture of the first video segment and the second video segment, preferences component 112 may determine the preferences for the flight control settings of the unmanned aerial vehicle to be common flight control settings between the first set of flight control settings and the second set of flight control settings where contextual information associated with capture of the first video segment is similar to contextual information associated with capture of the second video segment. Preferences component 112 may consider the consumption score associated with the individual video segments when determining commonalities between contextual information associated with capture of the individual video segments.

Transmission component 114 may be configured to effectuate transmission of instructions to the unmanned aerial vehicle. The instructions may include the determined preferences for the flight control settings. The instructions may be configured to cause the unmanned aerial vehicle to adjust the flight control settings of the unmanned aerial vehicle to the determined preferences. The instructions may be configured to cause the unmanned aerial vehicle to automatically adjust the flight control settings of the unmanned aerial vehicle to the determined preferences the next time the unmanned aerial vehicle is activated (e.g., turned on, in use, in flight, and/or capturing an image and/or video segment) or each time the unmanned aerial vehicle is activated. The unmanned aerial vehicle may adjust the flight control settings prior to and/or during capturing an image and/or video segment. The instructions may include recommendations for the determined preferences for the flight control settings such that the user of the unmanned aerial vehicle may choose to manually input and/or program the flight control settings of the unmanned aerial vehicle upon the unmanned aerial vehicle receiving the instructions.

The instructions may be configured to cause the unmanned aerial vehicle to automatically adjust the flight control settings of the unmanned aerial vehicle to the determined preferences based upon current contextual information associated with the unmanned aerial vehicle and current flight control settings of the unmanned aerial vehicle. The current contextual information may define current temporal attributes and/or current spatial attributes associated with the unmanned aerial vehicle. The current contextual information, current temporal attributes, and/or current spatial attributes may be similar to the contextual information, temporal attributes, and/or spatial attributes discussed above. System 100 and/or the unmanned aerial vehicle may determine and/or obtain current temporal attributes and/or current spatial attributes in real-time. Contextual information may include any information pertaining to an environment in which the unmanned aerial vehicle is in and/or surrounded by. Contextual information may be obtained via one or more sensors internal and/or external to the unmanned aerial vehicle. The contextual information may be transmitted to system 100 via unmanned aerial vehicle and/or directly from one or more sensors external to the unmanned aerial vehicle.

The geolocation attribute may be determined based upon one or more of geo-stamping, geotagging, user entry and/or selection, output from one or more sensors (external to and/or internal to the unmanned aerial vehicle), and/or other techniques. For example, the unmanned aerial vehicle may include one or more components and/or sensors configured to provide one or more of a geo-stamp of a geolocation of a current video segment prior to, during, and/or post capture of the current video segment, output related to ambient pressure, output related to depth, output related to compass headings, output related to ambient temperature, and/or other information. For example, a GPS of the unmanned aerial vehicle may automatically geo-stamp a geolocation of where the current video segment is captured (e.g., Del Mar, Calif.). The user may provide geolocation attributes based on user entry and/or selection of geolocations prior to, during, and/or post capture of the current video segment.

The time attribute may be determined based upon timestamping and/or other techniques. For example, the unmanned aerial vehicle may include an internal clock that may be configured to timestamp the current video segment prior to, during, and/or post capture of the current video segment (e.g., the current video segment may be timestamped at 1 PM PST). In some implementations, the user may provide the time attribute based upon user entry and/or selection of timestamps prior to, during, and/or post capture of the current video segment.

The date attribute may be determined based upon date stamping and/or other techniques. For example, the unmanned aerial vehicle may include an internal clock and/or calendar that may be configured to date stamp the current video segment prior to, during, and/or post capture of the current video segment. In some implementations, the user may provide the date attribute based upon user entry and/or selection of date stamps prior to, during, and/or post capture of the current video segment. Seasonal information may be based upon the geolocation attribute (e.g., different hemispheres experience different seasons based upon the time of year).

The content attribute may be determined based upon one or more action, object, landscape, and/or composition detection techniques. Such techniques may include one or more of SURF, SIFT, bounding box parameterization, facial recognition, visual interest analysis, composition analysis (e.g., corresponding to photography standards such as rule of thirds and/or other photography standards), audio segmentation, visual similarity, scene change, motion tracking, and/or other techniques. In some implementations content detection may facilitate determining one or more of actions, objects, landscapes, composition, and/or other information depicted in the current video segment. Composition may correspond to information determined from composition analysis and/or other techniques. For example, information determined from composition analysis may convey occurrences of photography standards such as the rule of thirds, and/or other photograph standards. In another example, a sport related action may include surfing. The action of surfing may be detected based upon one or more objects that convey the act of surfing. Object detections that may convey the action of surfing may include one or more of a wave shaped object, a human shaped object standing on a surfboard shaped object, and/or other objects.

Upon determination of current contextual information associated with the unmanned aerial vehicle, the unmanned aerial vehicle may be configured to adjust the current flight control settings to the determined preferences based upon the current contextual information and current flight control settings of the unmanned aerial vehicle. The current flight control settings may be the preferences for the flight control settings included within the instructions. The current flight control settings may be the last set of flight control settings configured the last time the unmanned aerial vehicle was in use. The current flight control settings may be pre-configured by the unmanned aerial vehicle.

Current contextual information may be transmitted to system 100 such that system 100 may determine preferences for flight control settings of the unmanned aerial vehicle in real-time or near real-time based upon user preferences of flight control settings relating to consumption scores associated with the first video segment (e.g., the first set of flight control settings) and the second video segment (e.g., the second set of flight control settings). The current contextual information may be transmitted to system 100 prior to, during, and/or post capture of the current video segment. Transmission component 114 may be configured to effectuate transmission of instructions to the unmanned aerial vehicle in real-time or near real-time in response to receiving the current contextual information associated with capture of the current video segment.

For example, system 100 may determine that the user has a preference for video segments including skiing. If a majority of the video segments that kept the user engaged included skiing and were captured with similar flight control settings, and if system 100 receives current contextual information indicating that the user is currently capturing a video segment including skiing, then transmission component 114 may effectuate transmission of instructions to the unmanned aerial vehicle, in real-time or near real-time, to automatically adjust the flight control settings of the unmanned aerial vehicle to the flight control settings of the video segments consumed by the user which included skiing. Transmission component 114 may be configured to effectuate transmission of the instructions to the unmanned aerial vehicle prior to and/or during capture of the current video segment. The flight control settings of the unmanned aerial vehicle may be adjusted prior to and/or during capture of the current video segment. The current flight control settings of the unmanned aerial vehicle which are different from the determined preferences included within the instructions may be adjusted to the determined preferences included within the instructions.

This process may be continuous such that system 100 may transmit instructions to the unmanned aerial vehicle based upon current contextual information associated with capture of a current video segment, current flight control settings, and/or flight control settings associated with previously stored and/or consumed video segments and/or portions of video segments which the user has a preference for. The preferences may be determined based upon contextual information associated with capture of the preferred video segments and/or portions of video segments.

A remote controller may be configured to override the determined preferences of the unmanned aerial vehicle. For example, if the unmanned aerial vehicle automatically adjusts the flight control settings to the determined flight control settings of the video segments consumed by the user received within the instructions, the user may manually override the flight control settings via a remote controller.

Figure 4:
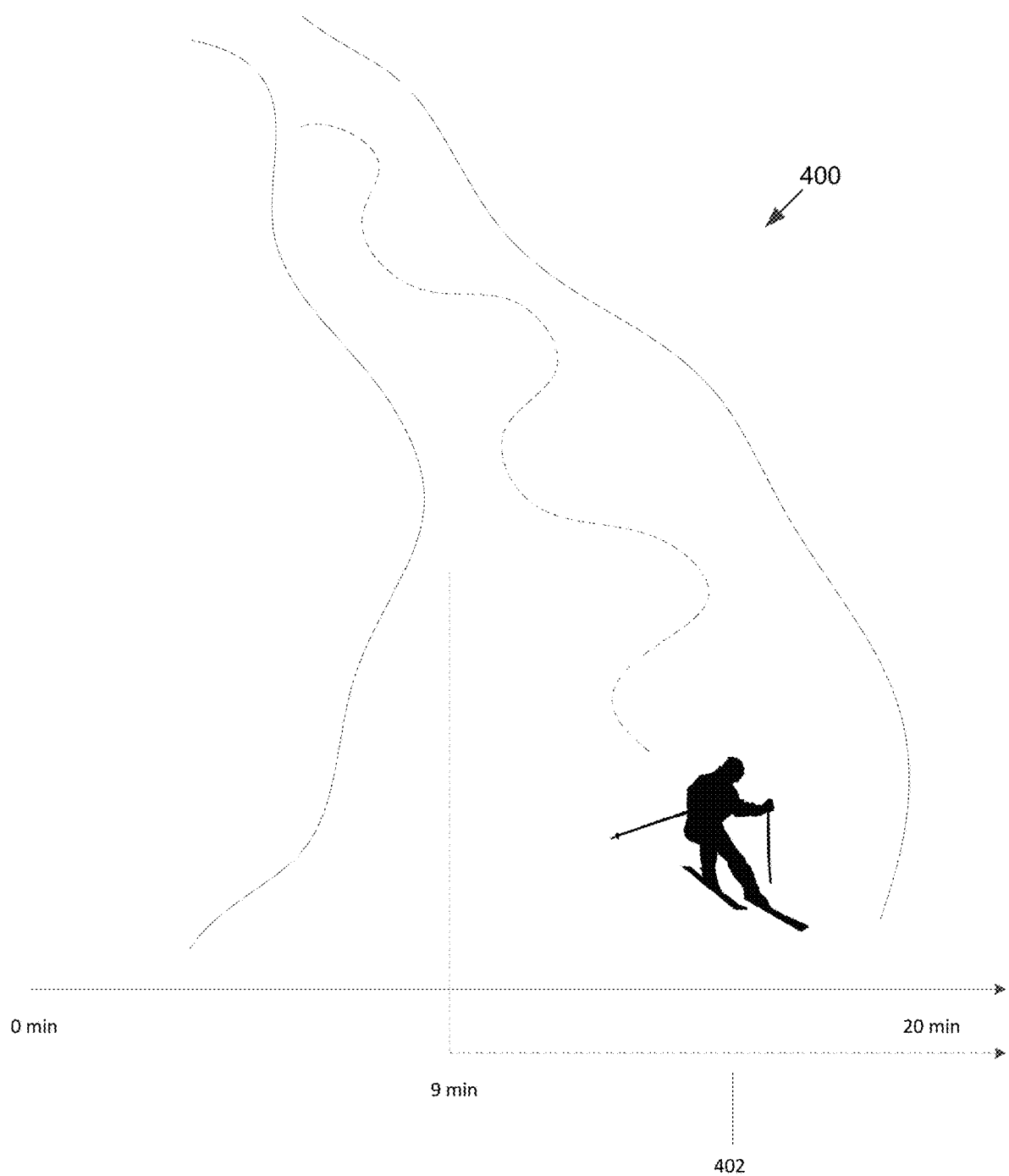
FIG. 4 illustrates content depicted within a video segment, in accordance with one or more implementations.

Referring to FIG. 4, video segment 400 is shown. The user may have consumed portion 402 of video segment 400 more frequently and/or shared portion 402 of video segment 400 more times than other portions of video segment 400 (e.g., portion 402 of video segment 400 may be associated with a consumption score representing a higher degree of interest of the user than other portions of video segment 400). System 100 may determine and/or obtain contextual information relating to capture of portion 402 includes that at least portion 402 of video segment 400 was captured on and/or near a ski slope in Tahoe and that a skier is depicted within portion 402 of video segment 400. Other portions of video segment 400 may simply depict the ski slope without the skier. System 100, via flight control settings component 110 of FIG. 1, may obtain a set of flight control settings associated with capture of portion 402 of video segment 400 and/or other portions of video segment 400 in a similar manner as described above. System 100, via preferences component 112 of FIG. 1, may determine the preferences for the flight control settings of the unmanned aerial vehicle associated with the user based upon the obtained set of flight control settings associated with capture of portion 402 and/or other portions of video segment 400 in a similar manner as described above. System 100, via transmission component 114 of FIG. 1, may effectuate transmission of the preferences for the flight control settings to the unmanned aerial vehicle associated with the user.

Figure 5:
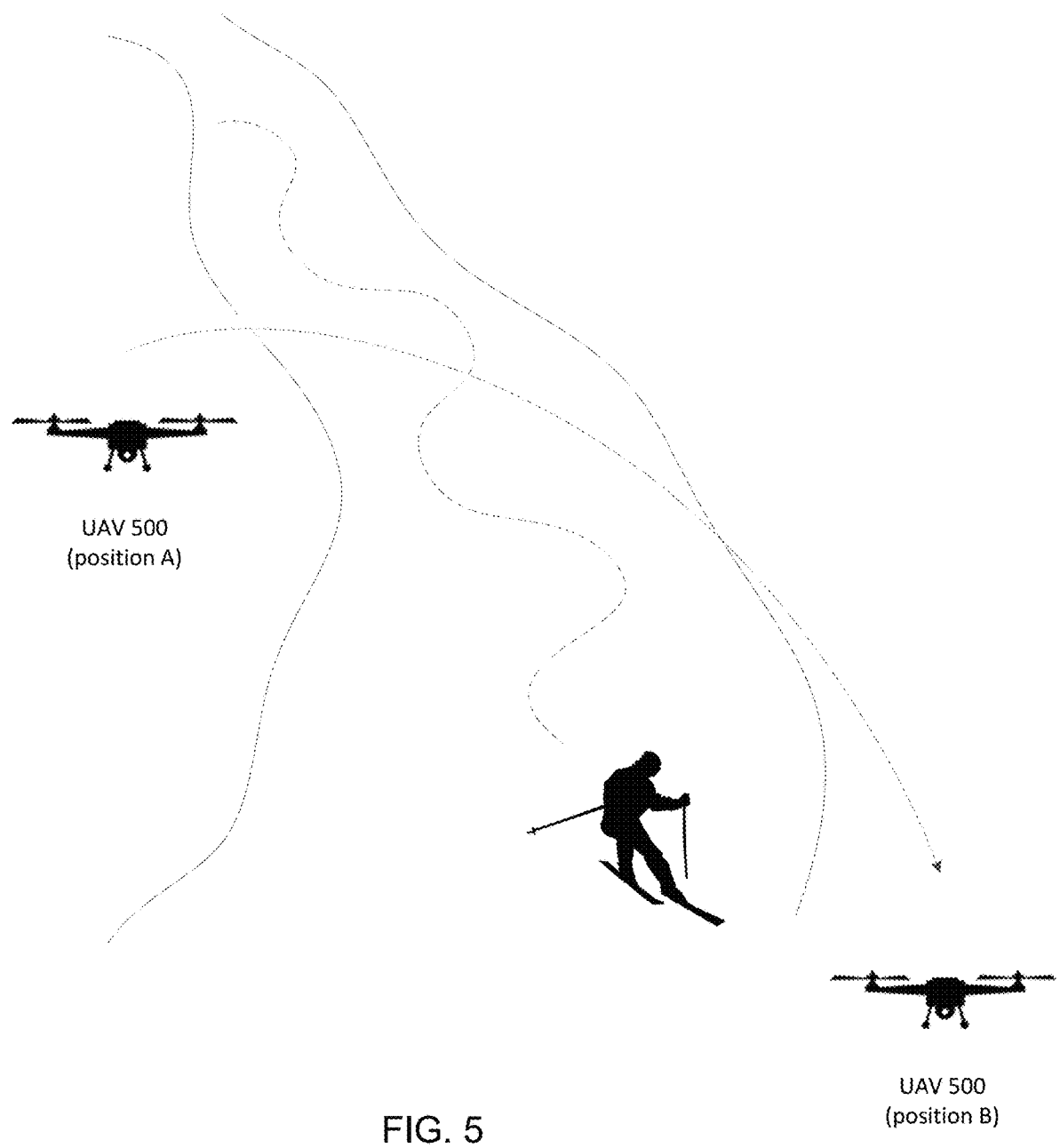
FIG. 5 illustrates an exemplary flight path of an unmanned aerial vehicle, in accordance with one or more implementations.

Referring to FIG. 5, UAV 500 is depicted. UAV 500 may be located in a first position (position A) near a similar ski slope as the ski slope depicted in video segment 400 of FIG. 4 (e.g., based upon a GPS associated with UAV 500). UAV 500 may begin capturing a video of the ski slope with current flight control settings. The current flight control settings of UAV 500 may include the last set of flight control settings when UAV 500 was last in use, pre-configured flight control settings by UAV 500, manual configuration of the flight control settings by the user, adjusted flight control settings based upon received instructions including preferences for the current flight control settings from system 100 (e.g., the received instructions may have been in response to UAV 500 being located near a ski slope), and/or other current settings of UAV 500. Upon a skier entering a field of view of one or more sensors associated with UAV 500, UAV 500 may be configured to automatically adjust the current flight control settings to a set of preferred flight control settings based upon instructions transmitted from system 100 while continuing to capture the video segment without interruption. The set of preferred flight control settings included within the instructions may include the determined preferences for the flight control settings based upon user engagement of portion 402 of video segment 400 of FIG. 4. For example, the determined preferred flight control settings from capture of video segment 400 may include capturing the skier from in front of the skier, on the East side of the ski slope, hovering at 15 feet above the ground, while zoomed into the skier, and then pans out to a wide-angle once the skier travels past UAV 500. UAV 500 may be on the West side of the ski slope in position A as the skier enters the field of view of one or more sensors associated with UAV 500 in position A. If UAV 500 receives the instructions including such preferences for the flight control settings, UAV 500 may automatically adjust the current flight control settings such that the flight path of UAV 500 may travel from position A to position B (e.g., the East side of the ski slope) to capture the skier while zoomed into the skier in front of the skier 15 feet above the ground and may pan out to a wide-angle once the skier travels past UAV 500. The user may manually override the flight control settings and/or determined preferences of UAV 500 at any time via a remote controller (not shown).

Referring again to FIG. 1, in some implementations, server(s) 102, client computing platform(s) 104, and/or external resources 120 may be operatively linked via one or more electronic communication links 126. For example, such electronic communication links 126 may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114, and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 6:
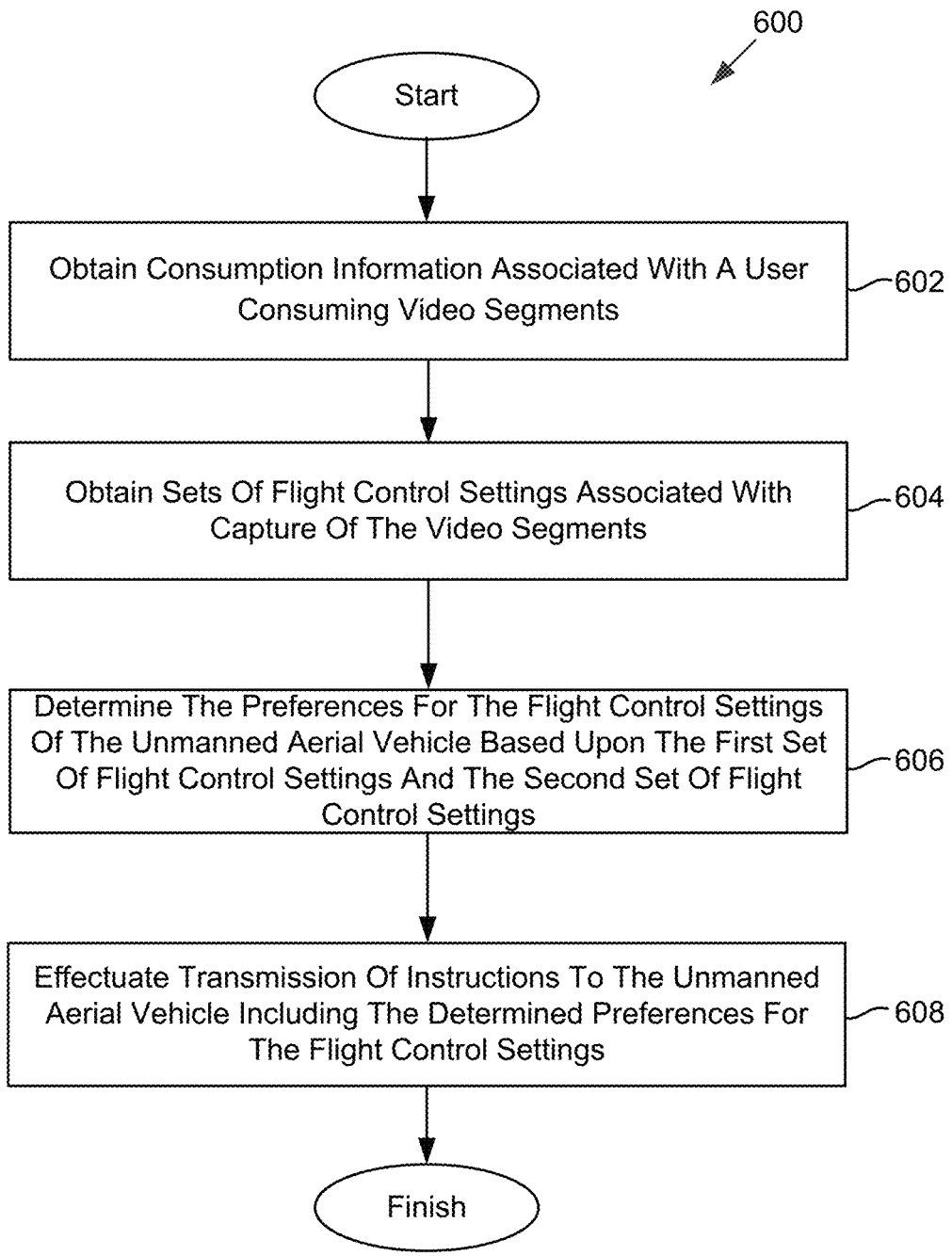
FIG. 6 illustrates a method for determining preferences for flight control settings of an unmanned aerial vehicle, in accordance with one or more implementations.

FIG. 6 illustrates a method 600 for determining preferences for flight control settings of an unmanned aerial vehicle, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 5 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, consumption information associated with a user consuming video segments may be obtained. Operation 602 may be performed by a consumption component that is the same as or similar to consumption component 108, in accordance with one or more implementations.

At an operation 604, sets of flight control settings associated with capture of the video segments may be obtained. Operation 604 may be performed by a flight control settings component that is the same as or similar to flight control settings component 110, in accordance with one or more implementations.

At an operation 606, preferences for the flight control settings of the unmanned aerial vehicle may be determined based upon the first set of flight control settings and the second set of flight control settings. Operation 606 may be performed by a preferences component that is the same as or similar to preferences component 112, in accordance with one or more implementations.

At an operation 608, instructions including the determined preferences for the flight control settings may be transmitted to the unmanned aerial vehicle. Operation 608 may be performed by a transmission component that is the same as or similar to transmission component 114, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system comprising one or more physical computer processors configured by computer readable instructions to:
   obtain information associated with playback of a video segment;
   obtain a set of settings defining one or more aspects of capture of the video segment;
   determine preferences of one or more control settings, related to control of an unmanned aerial vehicle, based on the set of settings; and
   effectuate transmission of instructions to a remote controller of the unmanned aerial vehicle, the instructions configured to cause the remote controller to transmit control information to the unmanned aerial vehicle so that the unmanned aerial vehicle executes the set of settings including the preferences of the one or more control settings.

2. The system of claim 1, wherein the information comprises consumption information.

3. The system of claim 2, wherein the consumption information characterizes any of user engagement during the playback of the video segment and a user response to the playback of the video segment.

4. The system of claim 3, wherein the consumption information is associated with a consumption score, the consumption score quantifying a degree of interest of a user consuming the video segment based on any of the user engagement during the playback of the video segment and the user response to the playback of the video segment.

5. The system of claim 3, wherein the user engagement during the playback of the video segment includes any of an amount of time a user consumes the video segment and a number of times the user consumes at least some portion of the video segment.

6. The system of claim 3, wherein the user response to the playback of the video segment includes any of commenting on the video segment, rating the video segment, and sharing the video segment.

7. The system of claim 1, wherein to obtain a set of settings defining one or more aspects of capture of the video segment comprises to:

obtain a set of control settings, related to the control of the unmanned aerial vehicle, defining one or more aspects of capture of the video segment based on the information.

8. The system of claim 1, wherein the one or more control settings comprise one or more flight control settings and the control information comprises flight control information.

9. The system of claim 8, wherein the one or more flight control settings include any of an altitude, a longitude, a latitude, a geographical location, a heading, and a speed of the unmanned aerial vehicle.

10. The system of claim 8, wherein the remote controller is configured to override the one or more flight control settings.

11. The system of claim 8, wherein the unmanned aerial vehicle is configured to implement the one or more flight control settings based on current contextual information that characterizes any of one or more current temporal attributes and current spatial attributes associated with the unmanned aerial vehicle.

12. The system of claim 11, wherein the one or more current temporal attributes and the current spatial attributes include any of a geolocation attribute, a time attribute, a date attribute, and a content attribute.

13. The system of claim 8, wherein the unmanned aerial vehicle includes a sensor configured to generate an output signal conveying visual information.

14. The system of claim 13, wherein the unmanned aerial vehicle is configured to implement the one or more flight control settings by controlling the sensor through adjustments of any of an aperture timing, an exposure, a focal length, an angle of view, a depth of field, a focus, a light metering, a white balance, a resolution, a frame rate, an object of focus, a capture angle, a zoom parameter, a video format, a sound parameter, and a compression parameter.

15. A method performed by a computing system including one or more physical processors, the method comprising:
    obtaining information associated with playback of a video segment;
    obtaining a set of settings defining one or more aspects of capture of the video segment;
    determining preferences of one or more flight control settings based on the set of settings; and
    transmitting instructions to a remote controller of an unmanned aerial vehicle, the instructions configured to cause the remote controller to transmit flight control information to the unmanned aerial vehicle to implement the preferences of the one or more flight control settings.

16. The method of claim 15, wherein the information is associated with a consumption score, the consumption score quantifying a degree of interest of a user consuming the video segment based on any of user engagement during the playback of the video segment and a user response to the playback of the video segment.

17. The method of claim 16, wherein the user engagement during the playback of the video segment includes any of an amount of time the user consumes the video segment and a number of times the user consumes at least some portion of the video segment.

18. The method of claim 16, wherein the user response to the playback of the video segment includes any of commenting on the video segment, rating the video segment, and sharing the video segment.

19. A method comprising:
    obtaining information associated with capture of a video segment;
    determining preferences of one or more flight control settings based on the information; and
    transmitting instructions, including the preferences of the flight control settings, to a remote controller of an unmanned aerial vehicle, the instructions configured to cause the remote controller to transmit flight control information to the unmanned aerial vehicle to implement the preferences of one or more flight control settings.

20. The method of claim 19, wherein the preferences of the one or more flight control settings are associated with consumption scores representing a higher degree of interest of a user.

* * * * *

UNITED STATES PATENT AND TRADEMARK OFFICE
CERTIFICATE OF CORRECTION

PATENT NO. : 11,640,169 B2
APPLICATION NO. : 16/827226
DATED : May 2, 2023
INVENTOR(S) : Pablo Lema and Shu Ching Ip It is certified that error appears in the above-identified patent and that said Letters Patent is hereby corrected as shown below:

In the Claims

Column 20, Claim 15, Line 8, after "settings" add --and executing the preferences of the one of more flight control settings--

Column 20, Claim 19, Line 35, after "settings" add --and executing the preferences of the one or more flight control settings--

Signed and Sealed this
Eighteenth Day of July, 2023

Katherine Kelly Vidal
*Director of the United States Patent and Trademark Office*